3,268,636
METHOD AND APPARATUS FOR INJECTION MOLDING FOAMED PLASTIC ARTICLES
Richard G. Angell, Jr., Highland Park, N.J., assignor to Union Carbide Corporation, a corporation of New York
Filed July 1, 1963, Ser. No. 291,898
13 Claims. (Cl. 264—51)

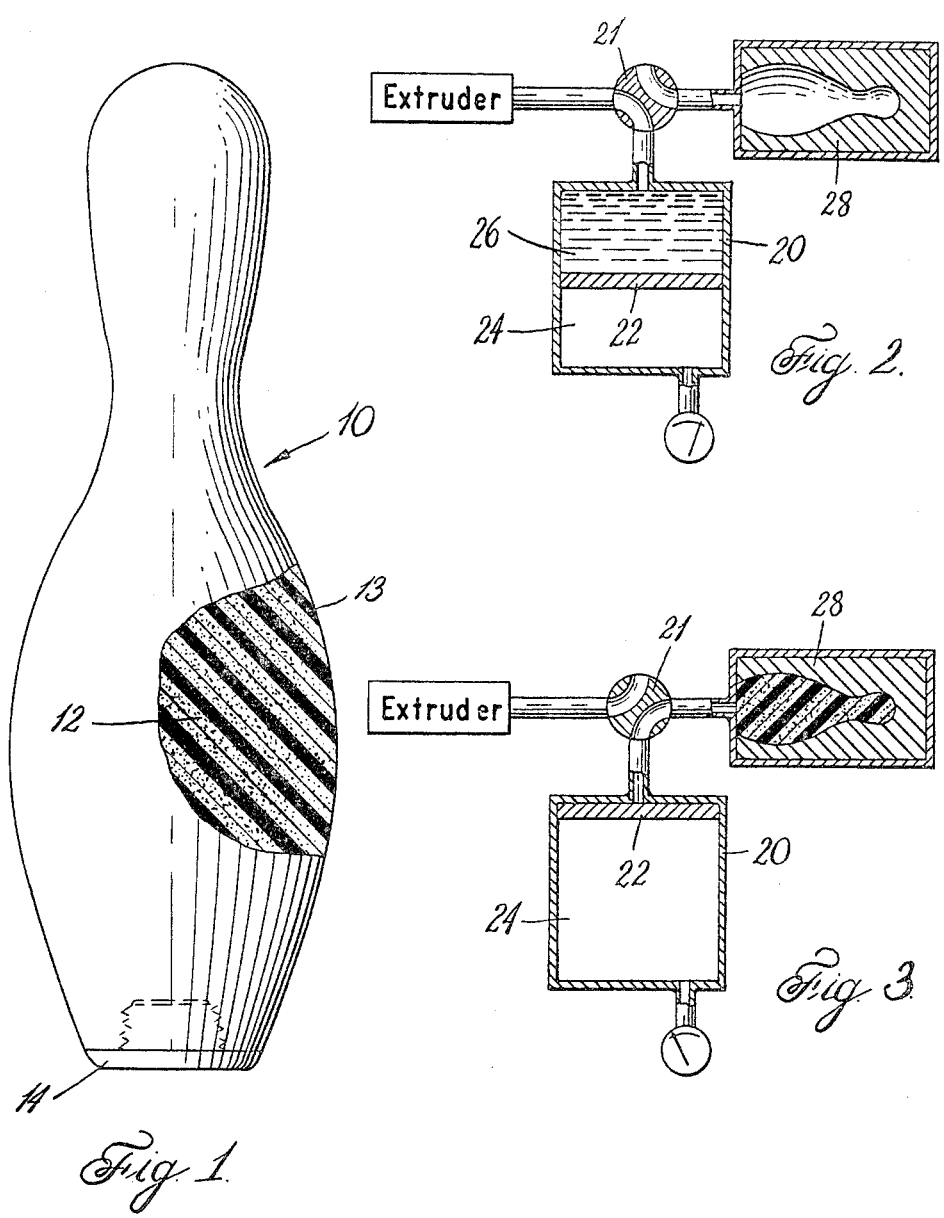

This invention relates to the molding of foamed articles and more particularly, to the molding of foamed thermoplastic articles having areas foamed to different degrees.

Molding processes, such as injection molding, normally are limited in the size and shape of the article which they can feasibly produce. Molds are conventionally filled with plastic in a molten state and must be free from long flow paths and sharp corners because of the flow resistance of the molten plastic material. This problem becomes particularly acute when attempting to mold high viscosity (low melt index) plastics. The problem further increases with decreasing mold temperatures because of the increasing rapidity of plastic solidification.

In injection molding, the use of molding pressures which are low can yield articles having flow marks and which are not sharply defined while the use of high pressures can yield high internal stresses and consequently low impact strength articles. Low molding temperatures can, as a further problem cause freezing of the plastic in the mold prior to complete filling of the mold as well as causing flow marks in the plastic article and low mechanical strength. High molding temperatures on the other hand, prolong molding time and can cause distortion of the finished article.

When attempting to mold articles having thick sections, molding techniques such as injection molding, tend to yield finished articles which how sink marks and warpage.

It has now been found that thermoplastics, even those with very high viscosities, can be molded with more complex configurations and having thicker sections than heretofore employed with injection molding, while nevertheless operating with the rapidity, and efficiency of an injection molding process.

The high quality of the finish of the resultant article, which is characteristic of injection molding is provided by the process, while in addition, strength and weight advantages are provided.

According to the present invention, foamed thermoplastic articles are molded by means of a process which includes the steps of mixing a blowing agent and a thermoplastic material, maintaining the mixture at a temperautre at least equal to the melting temperature of the thermoplastic material, and a pressure and temperature above the pressure and temperature at which the mixture foams. A mold which is maintained at a pressure below the pressure at which the mixture foams is rapidly filled with the mixture which then foams and expands and fills out the mold.

The temperature of the mold is preferably maintained below the melting temperature of the thermoplastic material and can advantageously be maintained at about normay room temperature thus providing a rapid cooling of the plastic in the mold. The resultant article has a high density shell and an integral, substantially simultaneously formed, low density core.

A further aspect of the present invention includes an apparatus for molding foamed thermoplastic articles. An accumulation chamber is provided which has means for controllably, and preferably, variably maintaining the chamber under superatmospheric pressure.

The accumulator is preferably in communication with means such as an extruder or the like, for charging molten thermoplastic material thereto. Advantageously, the extruder and accumulator chamber are in communication through a valve which, in a first position establishes communication between the extruder and accumulator, and in a second position terminates the communication between the extruder and accumulator and establishes communication between the accumulator and a mold.

Another aspect of the invention involves articles having high strength characteristics but low weight. Containers can be provided having rigid walls, and which in cross-section, have a dense surface zone and an integrally formed, cellular interior. The rigidity of an article varies with the cube of the thickness and varies in approximately an inverse proportion to changes in density. Thus, the cellular, rigid wall has greater flexural strength than a non-cellular and consequently denser wall of the same weight of material. The flexural strength is further enhanced through the use of the dense surface zone since this configuration places more material at the surface which is the zone in which flexural stresses are the greatest.

In addition to the high strength characteristics of the dense surface area-cellular interior material, decreased heat conductivity and consequently increased insulation properties are provided due to the internal air cells.

The invention will be better understood from the following specification wherein the invention is described by reference to the embodiments illustrated by the accompanying drawings wherein:

FIGURE 1 shows a side elevational view of a foamed article with a portion shown in section;

FIGURE 2 shows a stage of operation of an apparatus for molding a foamed article; and FIGURE 3 shows a later stage of operation of the apparatus of FIGURE 2.

As shown in FIGURE 1, articles such as the bowling pin 10, can be made according to the present invention, with a central region or core 12, which is highly cellular in construction, and a surface or shell-like region 13 which is dense, and substantially non-cellular construction.

Foamable polymeric materials in general, as for example, polymers and copolymers of olefinically unsaturated compounds and their derivatives such as polyethylene, polypropylene, polystyrene and vinyl resins, nylons, polycarbonates, polyhydroxyether, phenolics, polyurethanes and epoxy resins, can be employed, according to the present invention, in order to make articles such as shoe lasts, bowling pins, and containers, particularly fluid-tight and/or thermally insulated containers, such as storage battery cases.

There may be a gradual transition from the highly cellular core to the dense shell and, therefore, there can be an absence of a clearly defined line of demarcation between the two zones. Moreover, the dense region can vary to some extent in thickness. Thus, the term "shell" refers to a general peripheral zone of substantial unfoamed, non-cellular material.

The stiffness of an article such as a beam, varies with the cube of the thickness of the article and directly with density or the modulus of the material employed. If the density and consequently the modulus of a material were reduced by foaming, to one half of its original density and correspondingly increased to two times its original thickness, while maintaining the same total weight the stiffness would be increased eight fold due to the increased thickness, but reduced by one half due to the density decrease. A net four fold increase in stiffness would thus be produced without the use of additional material.

The use of a dense surface zone has been found to reduce the "effective" density decrease and the modulus decrease, by placing more material in the area of greatest stress. Thus, doubling the thickness of an article can produce a net increase in the stiffness of 5 or 6 times, not withstanding the one half decrease in density.

The increased ratio of rigidity to weight can substantially increase the economic feasibility of producing, for example, high strength plastic containers or "tote" boxes, of the type employed in carrying items such as fruits, glass bottles or the like by decreasing the amount of plastic required and consequently decreasing the cost of the article. A further economic advantage is realized in that reinforcing ribs need not be employed for strength thus very substantially decreasing the complexity and consequently, decreasing the cost of molds.

It has been found that the process which involves basically, maintaining a mixture of a thermoplastic material and a gas under sufficient pressure to prevent the gas from causing the foaming of the thermoplastic material, and rapidly filling a mold with the mixture, not only produces a dense shell region and a cellular core region, but can also produce an isotropic product free of internal stresses and distortions even in room temperature molds, which have complex shapes and thick sections.

The foaming mixture employed in the process can also contain conventional molding additives such as heat and light stabilizers, pigments, mold release agents, and slip agents. A conventional nucleating agent, such as calcium silicate, may be added to the mixture in order to enhance the uniformity of the cells produced by the foaming action. The ingredients of the mixture can be premixed, if desired, and charged to an extruder wherein the thermoplastic material is plasticized.

As shown in FIGURE 2, the extruder charges molten polymer 26, through a valve 21, and into an accumulator 20. The molten polymer 26, must be mixed with a blowing agent prior to the charging of the polymer into the mold.

The blowing agent can be selected from chemical compounds such as azo, N-nitroso, carbonate and sulfonyl hydrazide compounds which are heat decomposable to yield a gas such as carbon dioxide or nitrogen. The blowing agent can also consist of normally gaseous agents such as methyl chloride, propylene, butylene and gaseous fluorocarbon, as well as gases such as nitrogen, carbon dioxide or air. Volatile liquids such as pentane, water and liquid fluorocarbons can also be employed in the foaming of the polymer.

While the various types of blowing agents which can be employed to produce a foamed product can be mixed with the plastic material at various stages in the process, it is advantageous to add liquid or gaseous agents directly to the polymeric material, in the extruder, while the material is in a molten state, in order to obtain a uniform dispersal, of the agent within the molten plastic without employing additional mixing apparatus. Similarly, a decomposable chemical blowing agent is advantageously premixed with the polymer prior to the charging of the polymer into the extruder.

Careful consideration should be given to the means of obtaining a homogeneous distribution of the decomposable chemical foaming agent in the plastic compound. This can be conveniently achieved by adding the foaming agent in the form of solid particles or in the form of a dispersion in a vehicle compatible with the basic resin. The mixing is then carried out in conventional equipment such as a churn, colloid mill, three-roll mill, or Banbury, the choice of which depends upon the viscosity of the plastic compound. Alternatively, to obtain uniform dispersion, pellets of plastic resin can be coated with the blowing agent by tumbling. Regardless of the method used, the foaming agent must be incorporated below its decomposition temperature to prevent the possibility of gas losses taking place in the plastic mass prior to expansion.

In the case of chemical blowing agents premixed with the polymer the time-temperature relations within the extruder must be adequate to decompose the blowing agent if the gas is to be released within the extruder. The extruder pressure must then be maintained uniformly high at least until the mixture is transferred into the high pressure accumulator in order to prevent premature expansion of the cells.

The decomposition of the blowing agent can be delayed through the proper control of the extruder operating temperature and/or through the proper selection of the blowing agent. Thus, for example, diazoaminobenzene can be employed for decomposition at about 95° to 105° C. while azodicarbonamide can be employed for decomposition at the higher temperature range of 160° to 200° C.

In the case of azodicarbonamide, operation of the extruder at below 160° C. followed by heating of the mixture to above the decomposition when in the accumulator will selectively produce release of the blowing gas, when the mixture is in the accumulator.

Alternatively, the accumulator or the barrel of the extruder, can if desired, contain means, not shown, for the direct addition thereto of a liquid or gaseous blowing agent.

The accumulator when employed to receive molten polymer from an extruder, should be operated at a temperature sufficient to prevent solidification of the thermoplastic material within the chamber of the accumulator in order to avoid the sticking of the thermoplastic material to the walls of the chamber and undue flow resistance of the plastic material.

The accumulator 20, as shown in FIGURE 2, includes a piston 22, which divides the accumulator into two chambers and which resists the filling of the accumulator because of gas under pressure in the chamber 24 of the accumulator 20. The gas pressure within the chamber 24 is at least equal to the pressure necessary to maintain the mixture of thermoplastic material and gas in an unfoamed state. While a pressure of at least about 500 pounds per square inch (p.s.i.) normally will keep the gas in the thermoplastic material adequately compressed in order to prevent foaming, pressures of at least about 1500 p.s.i. have been found to give the best results. Pressures in excess of 5000 p.s.i. are usually not required for the proper operation of the accumulator and should normally be avoided because operating expenses increase with increasing pressures.

Since the charging of the accumulator with molten polymer 26, by the extruder, is opposed by the piston 22, the filling of the accumulator cannot start until the extruder pressure exceeds the back-pressure of the piston 22. As the piston 22 moves in the accumulator 20, the gas volume in the chamber 24 is decreased and the gas pressure is increased. The extruder pressure must continuously exceed the increasing piston pressure during the filling operation.

The amount of material charged into the accumulator chamber 26 is a function of the increase in pressure in the chamber 24, and therefore, a pressure gauge which communicates with chamber 24 may be directly calibrated in terms of amount of material charged to the accumulator.

When the desired amount of thermoplastic material has been charged into accumulator 20, the position of valve 21 is changed to the position as shown in FIGURE 3, whereby communication is suddenly established between the chamber 26 of the accumulator 20, and the cavity of the mold 28.

The back-pressure on the piston 22, in combination with the gas contained within the thermoplastic material serves to rapidly fill the mold. The filling of the mold and the foaming of the thermoplastic material within the mold, should preferably involve a period of approximately 1 to 5 seconds.

While lowering the temperature of the mold decreases the time required for cooling the thermoplastic material in the mold and consequently decreases the time required for the molding operation, when employing high density polyethylene for example, high mold temperatures of at least about 265° F. can produce a smooth glazed surface, which is desirable in many applications. Lower mold temperatures, on the other hand, tend to produce a grainy surface texture similar in appearance to the texture of wood.

Low mold temperatures can be employed without interfering with the flow of plastic in the mold and without producing internal stresses.

The ability to fill a cold mold, without encountering problems such as, incomplete filling due to premature solidification of plastic and high residual internal stress due to flow resistance, would, at least in part, appear to be due to the fact that the molten polymer, when suddenly transferred from the high pressure accumulator to the low pressure mold, "explodes" into small particles and fills the mold while in this form. The particles fuse together once in the mold, thus forming a resultant article which is substantially free of orientation and internal stresses.

The outwardly acting pressure of the expanding particles apparently forces the outermost mass of polymer against the surface of the mold, thus destroying the cell structure of this mass of material. This serves not only to form a dense peripheral zone, but also serves to produce a finished article which accurately conforms to the configurations of the mold.

The degree to which the plastic "explodes" as well as the rapidity of filling the mold and the degree of foaming increase with increasing quantities of blowing gas in the molten plastic. However, particularly in regard to density, the size and configuration of the mold influences the effect of the blowing gas.

Molds which cause sharp pressure drops to take place therein, due to a complex configuration, or sharp corners or the like, require the use of a greater amount of blowing gas in order to achieve a particular degree of foaming than a mold which has, for example, a simple configuration like that of a bowling pin and which produces a more gradual pressure drop. It would appear that the complex mold configuration, and the consequent sharp change in pressure which the mixture undergoes cause a substantial loss of gas from the mixture. This gas leaves the mold through the vent openings conventionally employed in molds, and thus is unavailable to produce a foaming action.

The following examples are not intended to illustrate the limits of the invention, but rather are exemplary of modes of operation under the present invention. Except as otherwise indicated, all temperatures are in "° F.," pressures are in pounds per square inch (p.s.i.), weights are in pounds and ingredients in mixtures are in parts by weight.

*Example I*

A mixture comprising 100 parts by weight of polyethylene and one-quarter of 1 part by weight azodicarbonamide were charged to a Banbury mixer and mixed at a temperature below the decomposition temperature of the azodicarbonamide. The polyethylene employed had a density of about .96 and a melt index of about .2.

The mixture was charged to the cylinder of a screw extruder wherein it was thoroughly worked and fed therealong by means of a screw. The cylinder was heated to a temperature of about 400° F. to cause the dispersed azodicarbonamide particles to decompose.

Employing an apparatus as shown in FIGURES 2 and 3, the extruder charged material to an accumulator maintained at a temperature of about 330° F. and at a pressure of about 1740 p.s.i.

The pressure exerted on the composition by the screw and the back-pressure exerted by the accumulator was such as to substantially prevent the gas resulting from the decomposition of the azodicarbonamide particles from expanding.

The pressure on the accumulator continuously increased as the extruder operated indicating that material was being charged to the accumulator. When a pressure of 3200 p.s.i. was reached the rotation of the screw of the extruder was stopped and thus the extruder ceased to charge material to the accumulator. With the pressure on the accumulator stabilized at about 3200 p.s.i. the valve between the accumulator and a bowling pin mold was rapidly changed from the position as shown in FIGURE 2, to the position as shown in FIGURE 3.

The material rapidly transferred into the mold which was maintained at atmospheric pressure and a temperature of about 320° F.

After a few second elapsed, the mold was rapidly cooled and then opened and the resultant bowling pin weighed. The bowling pin had a weight of 3.05 pounds and had a glazed, polished-like surface. The bowling pin was cut in half, and was seen to have a dense outer shell and a cellular core. At a distance of about one-quarter of an inch from the surface, the density of the material substantially decreased.

*Example II*

Employing the process of Example I, a bowling pin was formed in a mold maintained initially at 265° F., and then a few seconds after the filling operation, rapidly cooled in order to reduce the cycle time.

The surface of the pin was glazed in appearance and the internal structure was similar to that of the pin of Example I.

*Example III*

The process of Example I was employed to produce a bowling pin in a mold maintained at 235° F. prior to filling and rapidly cooled a few seconds after filling.

The resultant bowling pin had a rough, grainy surface, similar in texture to wood.

*Example IV*

A mixture of 50 parts polyethylene, having a density of about .96 and 50 parts polypropylene were premixed in a Banbury mixer and charged into an extruder. The mixture was worked and heated in the extruder until the material attained a temperature of about 420° F. Nitrogen gas was slowly fed into the barrel of the extruder and therein mixed with molten polyethylene-polypropylene mixture.

As shown in FIGURE 2, the extruder was in series with an accumulator maintained under pressure, thus preventing the nitrogen from producing a foaming action. The accumulator temperature was maintained at about 330° F. and the pressure was increased from 1800 p.s.i. to 2650 p.s.i. The position of the valve between the extruder and the accumulator was changed from the position as shown in FIGURE 2, to the position as shown in FIGURE 3, in order to terminate communication between the extruder and the accumulator and simultaneously establish communication between the accumulator and the mold.

The mold was maintained at about 70° F., and as in the previous examples, was maintained at atmospheric pressure, while the accumulator was maintained at about 330° F.

The mold design was for the form of a cylindrical container, to be used for the storage of artillery shells. The container had a four inch outside diameter and was twenty inches long, with wall thicknesses between 250 mils and 375 mils.

No problem was encountered in having the molten mixture completely fill out the mold and accurately conform to the shape of the mold.

Internal examination revealed a foamed core structure and a thin dense region at the surfaces of the cylinder, which was similar to that of Example I. The foamed cylinder was found to be isotropic, that is, to have properties which were the same both in the axial direction and transverse to axis.

The surface of the cylinder had a grainy texture similar to that of wood.

Example V

A mixture comprising, in parts by weight, 100 parts of a 75/25 polyethylene, polypropylene copolymer, 8 parts azodicarbonamide, 1.30 parts calcium stearate, 1.20 parts hydrated calcium silicate, 0.3 part of heat and light stabilizers, 0.1 part oleamide and 1.56 parts of titanium dioxide pigment, was premixed as set forth in Example I.

The additives, calcium stearate, calcium silicate, and oleamide were employed for their conventional functions as a mold release, a nucleating agent and a slip agent respectively.

The process of Example I was employed in order to form a casing for a storage battery. The stock was heated to 375° F. in the extruder and the accumulator pressure was increased from 2000 p.s.i., before filling, to 2700 p.s.i.

The mold, in the form of a battery casing, was maintained at room temperature and pressure and rapidly filled with the mixture from the accumulator.

The molded casing included two cell dividers, and required no further finishing operation.

In the manner conventionally employed in the battery art, a three cell, 6 volt, lead-acid storage battery was built by inserting of electrodes and electrolyte into the casing. The dielectric strength of the half inch thick casing walls was found to be above 150 volts/mil. After one month, a weight increase of less than 1% was found and the strength of the material was substantially unchanged. Internal examination of a casing wall revealed the usual foamed core-dense shell structure and also showed an increased uniformity of cell size and distribution apparently because of the use of the nucleating agent.

Example VI

A mixture of 100 parts of .96 density polyethylene and one quarter part azodicarbonamide were premixed in the manner set forth in Example I.

The extruder temperature was maintained below about 300° F. and employing the process of Example I, the mixture was charged into an accumulator initially maintained at 1450 p.s.i. and below about 300° F. The accumulator was heated to 400° F. and the material which was heated to 375° F., in the accumulator and maintained at a maximum pressure of 3000 p.s.i. was released into a 70° F. mold, having the shape of a shoe last. The shoe last weighed about 3 pounds, and had a density of about .73. Under internal examination, the same cellular core-solid outer skin structure produced by the processes set forth in Examples I through IV, was found to have been formed.

The shoe last was found to hold nails even after repeated nailing and extraction of nails. The extremely fine cell structure of the core section was also noted to have adequate nail holding power.

A comparison of bowling pins made in accordance with Examples I, II and III, and coated wooden pins yielded comparable results with regard to impact response, impact sound and center of gravity. The surface hardness and impact strength of the foamed high density polyethylene bowling pins exceeded that of the coated wooden pins.

The bowling pin of Example III, was provided with an ethyl cellulose, in order to provide a finished appearance. Although adhesion to polyethylene is normally difficult, the coating was found to tenaciously adhere to the grainy surfaces polyethylene. The surfaces of the bowling pins of Examples I and II were adequate in appearance without the use of a coating.

Because of the ability to accurately measure the amount of plastic which will be charged to the mold, greater exactness of weight can be attained in the foamed pins of the present invention, than is attained in wooden pins.

Conventional stains, of the type employed in staining wood, when applied to conventionally molded or extruded polyethylene articles can be rubbed off the surface of polyethylene after the stain has been fully dried. The foamed articles of Examples III through VI, however, retain stains without the need for further surface treatment. The use of wood colored stains yields an article which, because of its grainy surface texture, has the appearance of wood. Since, as previously noted, the foamed articles can also have the sound, impact response and weight characteristics of wood, wood substitute articles can be produced by the proces of the present invention. Of particular significance, is the ability to produce a molded plastic cabinet having the aesthetically desirable wood-like appearance in addition to the characteristic acoustical properties of wood. Moisture resistance and high impact resistance can thus be built into a speaker cabinet without a sacrifice in fidelity.

A further advantage of the foamed plastic is seen in the ability to economically provide simultaneously, high impact strength and thermal insulation.

The thermal insulation properties of the battery casing of Example V were compared with that of an unfoamed casing having the same dimensions and composition. Water at about 170° F. was placed in each of the casings, which were initially at 86° F. The exterior wall temperatures of the solid casing rose to 122° F. after ten minutes, whereas the foam casing took twelve minutes to reach a maximum temperature of 116° F. The water temperature in the solid plastic casing dropped to about 129° F. after 40 minutes and to about 99° F. after two hours. The foamed plastic casing took one hour to reach 122° F. and 160 minutes to reach 99° F. The water in the solid plastic casing reached the equilibrium temperature after four hours and after five hours the water in the foamed plastic casing reached the equilibrium. Further thermal improvement can be achieved in the foamed plastic casing by employing thicker walls. This can be achieved through the use of an increased quantity of blowing agent and/or by employing the same amount of plastic as required to make the solid plastic casing.

The following is an explanation of the terms "melt index," "melting temperature," and "foaming pressure," as heretofore employed:

Melt index is an indication of molecular weight and viscosity and is determined in accordance with ASTM Test D 1238–52T; ASTM Standards, 1952, Part 6, p. 735. The term "melting temperature" refers to the general temperature range at which the material becomes sufficiently fluid to be processed in the manner heretofore described. This material would thus be about sufficiently soft or fluid to flow through an extruder, an accumulator or a mold, or be foamed and expanded by an internally contained gas.

The term "foaming pressure" refers to the pressure at which an internally contained gas can produce the substantial foaming expansion of the plastic material within which it is contained.

Although the invention has been described in its preferred forms with a certain degree of particularity, it is understood that the present disclosure of the preferred forms has been made only by way of example and that numerous changes in the details of construction and the combination and arrangements of parts may be resorted to without departing from the spirit and the scope of the invention as hereinafter claimed.

What is claimed is:

1. Process for molding foamed thermoplastic articles which comprises the steps of
   (a) melting a mixture of a blowing agent and a foamable thermoplastic material in an extruder at a temperature above the foaming temperature of said blowing agent and at a pressure above the foaming pressure thereof;
   (b) extruding the resulting molten mixture into an expanding accumulation zone while maintaining said mixture therein in the molten state and at a pressure above the foaming pressure thereof;
   (c) establishing communication between said accumulation zone and a mold maintained at a pressure no greater than the foaming pressure of said molten mixture;

(d) rapidly forcing said molten mixture from said accumulation zone into said mold whereby the pressure differential between said accumulation zone and said mold causes said mixture to rapidly expand in said mold.

2. Process of claim 1 wherein said mold is maintained at a pressure of from substantially atmospheric pressure to no greater than the foaming pressure of said molten mixture.

3. Process of claim 1 wherein said mold is maintained at a temperature below the melting temperature of said mixture.

4. Process of claim 1 wherein the pressure in said extruder and said accumulation zone is from at least about 500 p.s.i. to about 5000 p.s.i.

5. Process for molding foamed thermoplastic articles which comprises the steps of
(a) melting a foamable thermoplastic material in an extruder;
(b) mixing the resulting molten thermoplastic material in said extruder with a fluid blowing agent at a temperature above the foaming temperature of said blowing agent and at a pressure above the foaming pressure thereof;
(c) extruding the resulting molten mixture into an expanding accumulation zone while maintaining said mixture therein in the molten state and at a pressure above the foaming pressure thereof;
(d) establishing communication between said accumulation zone and a mold maintained at a pressure no greater than the foaming pressure of said molten mixture;
(e) rapidly forcing said molten mixture from said accumulation zone into said mold whereby the pressure differential between said accumulation zone and said mold causes said mixture to rapidly expand in said mold.

6. Process of claim 5 wherein said mold is maintained at a pressure of from substantially atmospheric pressure to no greater than the foaming pressure of said molten mixture.

7. Process of claim 5 wherein said mold is maintained at a temperature below the melting temperature of said mixture.

8. Process of claim 5 wherein the pressure in said extruder and said accumulation zone is from at least about 500 p.s.i. to about 5000 p.s.i.

9. Apparatus for molding foamed thermoplastic articles comprising
(a) extruder means adapted to melt and extrude a mixture of a blowing agent and a foamable thermoplastic material at a temperature above the foaming temperature of said blowing agent and at a pressure above the foaming pressure thereof;
(b) expandable accumulation means adapted to expand and receive the resulting molten mixture from said extruder means and to maintain said mixture therein in the molten state and at a pressure above the foaming pressure thereof;

(c) mold means adapted to be maintained at a pressure no greater than the foaming pressure of said molten mixture;
(d) means for establishing and terminating communication between said accumulation means and said mold means;
(e) means for rapidly forcing said molten mixture from said accumulation zone into said mold when communication is established therebetween whereby the pressure differential between said accumulation means and said mold means causes said mixture to rapidly expand in said mold means.

10. Apparatus of claim 9 wherein said extruder means is adapted to melt and mix a foamable thermoplastic material with a fluid blowing agent and to extrude the resulting molten mixture at a temperature above the foaming temperature of said mixture and above the foaming pressure thereof.

11. Apparatus of claim 9 wherein said mold means is adapted to be maintained at a pressure of from substantially atmospheric pressure to no greater than the foaming pressure of said molten mixture.

12. Apparatus of claim 9 wherein said mold means is adapted to be maintained at a temperature below the melting temperature of said mixture.

13. Apparatus of claim 9 wherein said extruder means and said accumulation means are adapted to maintain said mixture under a pressure of from at least about 500 p.s.i. to about 5000 p.s.i.

References Cited by the Examiner

UNITED STATES PATENTS

| | | | |
|---|---|---|---|
| 2,767,436 | 10/1956 | Noland et al. | 264—321 |
| 2,893,877 | 7/1959 | Nickolls | 264—321 XR |
| 3,007,203 | 11/1961 | Ammons. | |
| 3,015,132 | 1/1962 | Bunting | 264—51 |
| 3,029,472 | 4/1962 | Fischer | 18—48 XR |
| 3,058,161 | 10/1962 | Beyer et al. | |
| 3,075,036 | 1/1963 | Shank et al. | 136—170 XR |
| 3,095,337 | 6/1963 | Chase. | |
| 3,155,753 | 11/1964 | Weissman et al. | 264—45 |
| 3,162,703 | 12/1964 | Eyles | 264—51 |
| 3,168,207 | 2/1965 | Noland et al. | 264—48 XR |
| 3,189,243 | 6/1965 | Lux | 220—9 XR |
| 3,194,864 | 7/1965 | Richie | 264—51 XR |
| 3,211,605 | 10/1965 | Spaak et al. | 264—51 XR |
| 3,218,375 | 11/1965 | Hardwick | 264—51 XR |

FOREIGN PATENTS

| | | |
|---|---|---|
| 641,073 | 5/1962 | Canada. |
| 854,586 | 11/1960 | Great Britain. |
| 358,585 | 1/1962 | Switzerland. |

OTHER REFERENCES

Modern Plastics, "New techniques for processing expandable styrene foam; injection molding," September 1960, pp. 113, 115, 202.

Plastics World, "Injection molding expandable polystyrene beads," Jan. 1962, pp. 18ff.

ALEXANDER H. BRODMERKEL, *Primary Examiner.*

P. E. ANDERSON, *Assistant Examiner.*

Disclaimer 3,268,636.—*Richard G. Angell, Jr.*, Highland Park, N.J. METHOD AND APPARATUS FOR INJECTION MOLDING FOAMED PLASTIC ARTICLES. Patent dated Aug. 23, 1966. Disclaimer filed Oct. 15, 1971, by the assignee, *Union Carbide Corporation*.

Hereby enters this disclaimer to claims 9, 10, 11, 12 and 13 of said patent.

[*Official Gazette February 15, 1972.*]